G. P. VANIER.
POTASH BULB.
APPLICATION FILED MAY 8, 1912.
1,034,170.
Patented July 30, 1912.
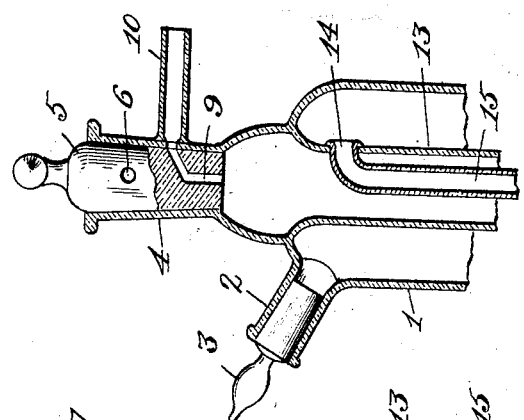
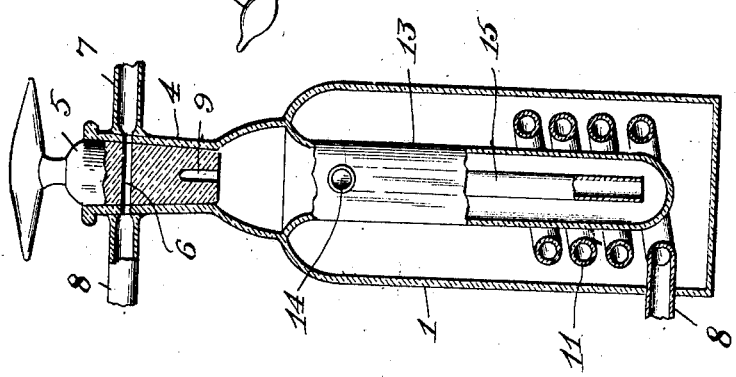
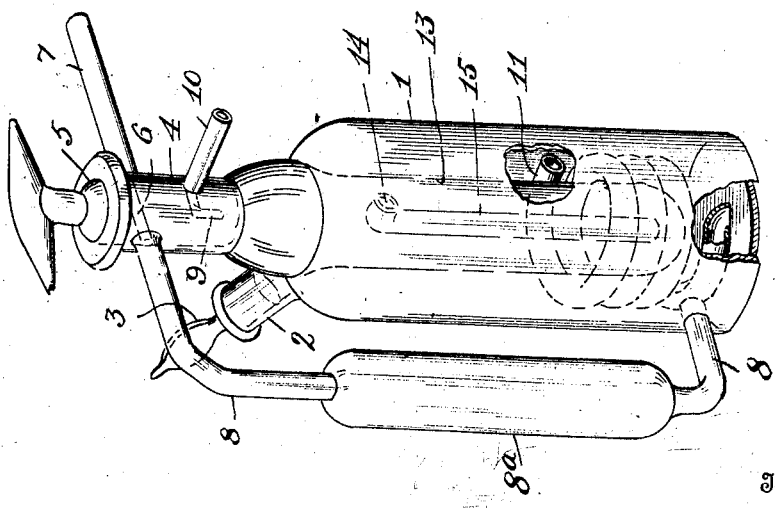

UNITED STATES PATENT OFFICE.

GEORGE P. VANIER, OF STEELTON, PENNSYLVANIA.

POTASH-BULB.

1,034,170. Specification of Letters Patent. Patented July 30, 1912.

Application filed May 8, 1912. Serial No. 695,900.

*To all whom it may concern:*

Be it known that I, GEORGE P. VANIER, a citizen of the United States of America, residing at Steelton, Pennsylvania, have invented certain new and useful Improvements in Potash-Bulbs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to chemical apparatus, and to that type of apparatus used by analytical chemists and known as "potash bulbs". They are small glass vessels capable of holding an absorbent of a gas or vapor, and are weighed before and after the gas or vapor has been passed through them, the difference between the two weights giving the weight of the gas or vapor absorbed. They necessarily are small, to permit ready handling and weighing in laboratory manipulation, and are universally constructed of glass. Such bulbs, among other uses, are used to a large extent for determining carbon in various kinds of steel by the direct combustion of the steel in oxygen, the products of the combustion being passed through the bulb, the carbonic acid being absorbed by the solution of potash in the bulb.

Referring to the drawings, in which like parts are similarly designated—Figure 1 is a perspective view showing the potash bulb, full size. Fig. 2 is a transverse vertical section; Fig. 3 is a partial section, taken at right angles to Fig. 2.

The container 1 has a flat bottom sufficiently large to give stable support and is provided with a filling neck 2 closed by a stopper 3, and has a neck 4 provided with a stopper 5 acting as a valve. In the valve-stopper are two passages, the one 6 connecting a gas inlet nipple 7 with a gas inlet tube 8 that extends from the neck 4 to near the bottom of the container 1 and is provided with an enlargement 8ª. The other passage, 9, controls the exit of gas through a gas outlet nipple 10. The gas inlet tube 8 is sealed to and passes through the wall of the container 1 and is connected to the lower end of an open-ended spiral tube 11.

Fused to the container and extending from near the neck 4 downward into the container 1 is a drying chamber 13, provided with an entrance orifice 14 near its upper end. From this orifice in the drying chamber a tube 15 extends nearly to the bottom of the chamber 13, said tube being open at its lower end.

The operation is as follows: The stopper-valve 5 is removed, and the drying chamber 13 is filled with fine dry caustic potash, say about to the level of 14. Advantageously the potash should pass through a five mesh screen, but not through a ten mesh screen. On top of this is placed finer caustic potash, say such as will pass through a ten mesh screen, but not through a twenty mesh screen. When filled, the dry potash should be about at the level of the juncture between 1 and 13. On top of the potash place a small wad of cotton or glass wool. Remove stopper 3, and in receptacle 1 place a caustic potash solution, that customarily used being one pound of potash to 600 c. c. of water. The level of the liquid potash should reach the top of coil 11. Grease stopper 3 and valve 5 and replace. The outside of the bulb is now carefully washed and dried, a mixture of alcohol and ether being sometimes used for this purpose. After having displaced the air by bubbling oxygen through the bulb, the valve is turned to closed position and the bulb and contents carefully weighed. The nipple 7 is then connected to the combustion tube, or the equivalent in which the carbon is burned, and valve 5 is opened. The products of combustion pass through nipple 7, passage 6, and gas inlet tube 8, 8ª into coil 11, which, being open-ended, is filled with potash solution, and the gas passes upward inside the spiral in a succession of small bubbles surrounded by potash solution. These gas bubbles leave the upper end of the spiral beneath the level of the solution in the container 1. The gas then passes into the drier at 14 to the bottom of the dry potash in 13 and rises through the dry potash, passing through 9 and 10. The carbonic acid is thoroughly absorbed from the gas as the path through the spiral 11 is quite long, about ten inches, and the moisture absorbed by the gas from the solution in 11 is separated from the gas again in 13. Valve 5 is closed when the combustion is complete and the bulb is removed and weighed. There is a constant circulation of absorbent through the spiral 11 from the bottom to the top.

There are numerous advantages in this bulb over those heretofore used, as follows: A single stop-cock or valve to simultaneously close inlet and outlet and prevent diffusion of oxygen while weighing. A large capacity; six grams or more of $CO_2$ can be absorbed, thus enabling its use in a hundred or more analyses before re-filling. It presents a smooth outer surface of minimum area, readily kept clean, and decreases the outer area for the condensation of moisture. It is self-supporting, and presents a firm base when placed on the scale-pan. The drying tube is vertical, gas enters at its bottom, and it seldom stops up, as the solid potash forms a pool and liquid seal at the bottom of the tube 15 as the potash deliquesces. The gas may be passed through at a rapid rate without fear of loss of $CO_2$ or of moisture, and at the same time the action is perfectly quiet, so that there is no jumping or spraying of the absorbent solution. The drying tube is inside the container 1 and is protected from breakage.

I claim—

1. A potash bulb comprising a container, a drying chamber within the container and communicating therewith, and a valved stopper for the chamber controlling the inlet of gas to the container and its exit from said chamber.

2. A potash bulb comprising a container having a gas inlet, a flat base and a neck, a drying chamber within the container and connected to the container at its upper end, a tube extending from near the top of the chamber to near its bottom establishing connection between container and chamber, and a valved stopper for the chamber having passages for simultaneously controlling the inlet of gas to the container and the outlet of gas from the chamber.

3. A potash bulb comprising a container having a neck, a drying chamber within and connected to the container near said neck and having communication with the container, a gas inlet tube extending outside the container from said neck to near the bottom of the container, and an open-ended spiral conduit connected to the tube inside the container and surrounding said chamber, and a valved stopper in the neck controlling the inlet of gas to the tube and the outlet of gas from the chamber.

4. A potash bulb comprising a container having a neck, a drying chamber closed at its lower end and connected at its upper end to the chamber below the neck, a tube in said chamber extending from an opening in the wall of said chamber to near its bottom, a gas inlet tube extending from the neck to near the bottom of the container and having an enlarged portion between its ends, a spiral tube surrounding said chamber and connected to the gas inlet tube at a point near the lower end of said spiral, and a stopper in the neck having ports controlling the passage of the gas to the gas inlet tube and the passage of gas from said chamber.

In testimony that I claim the foregoing as my invention, I have signed my name in presence of two subscribing witnesses.

GEORGE P. VANIER.

Witnesses:
  SOLOMON HOICY,
  F. A. NORRIS.